United States Patent

[11] 3,546,418

[72] Inventor Harold J. Graham
 Sharon, Massachusetts
[21] Appl. No. 730,694
[22] Filed May 21, 1968
[45] Patented Dec. 8, 1970
[73] Assignee AGM Industries, Inc.
 Canton, Massachusetts
 a corporation of Massachusetts

[54] STUD WELDING APPARATUS
 7 Claims, 3 Drawing Figs.
[52] U.S. Cl. .................................................. 219/95,
 219/98
[51] Int. Cl. .................................................. B23k 9/22
[50] Field of Search .................................... 219/95, 98,
 99, 89

[56] References Cited
UNITED STATES PATENTS

| | | | |
|---|---|---|---|
| 2,685,630 | 8/1954 | Graham ........................ | 219/95 |
| 2,809,274 | 10/1957 | Quinlan ........................ | 219/95 |
| 3,414,699 | 12/1968 | Neumeier et al. ............ | 219/98X |

*Primary Examiner*—J. V. Truhe
*Assistant Examiner*—R. O'Neill
*Attorney*—Robert F. O'Connell ABSTRACT: A stud welding apparatus in which the stud supporting means comprises an upper section of relatively large mass, a lower independently movable, stud holder section of relatively small mass which is flexibly coupled to the upper section, and an air gap therebetween. The percussive impact force at the weld is due essentially to the mass of the lower section only and air supplied under pressure to the air gap prevents a rebounding of the stud away from the workpiece to which it is being welded.

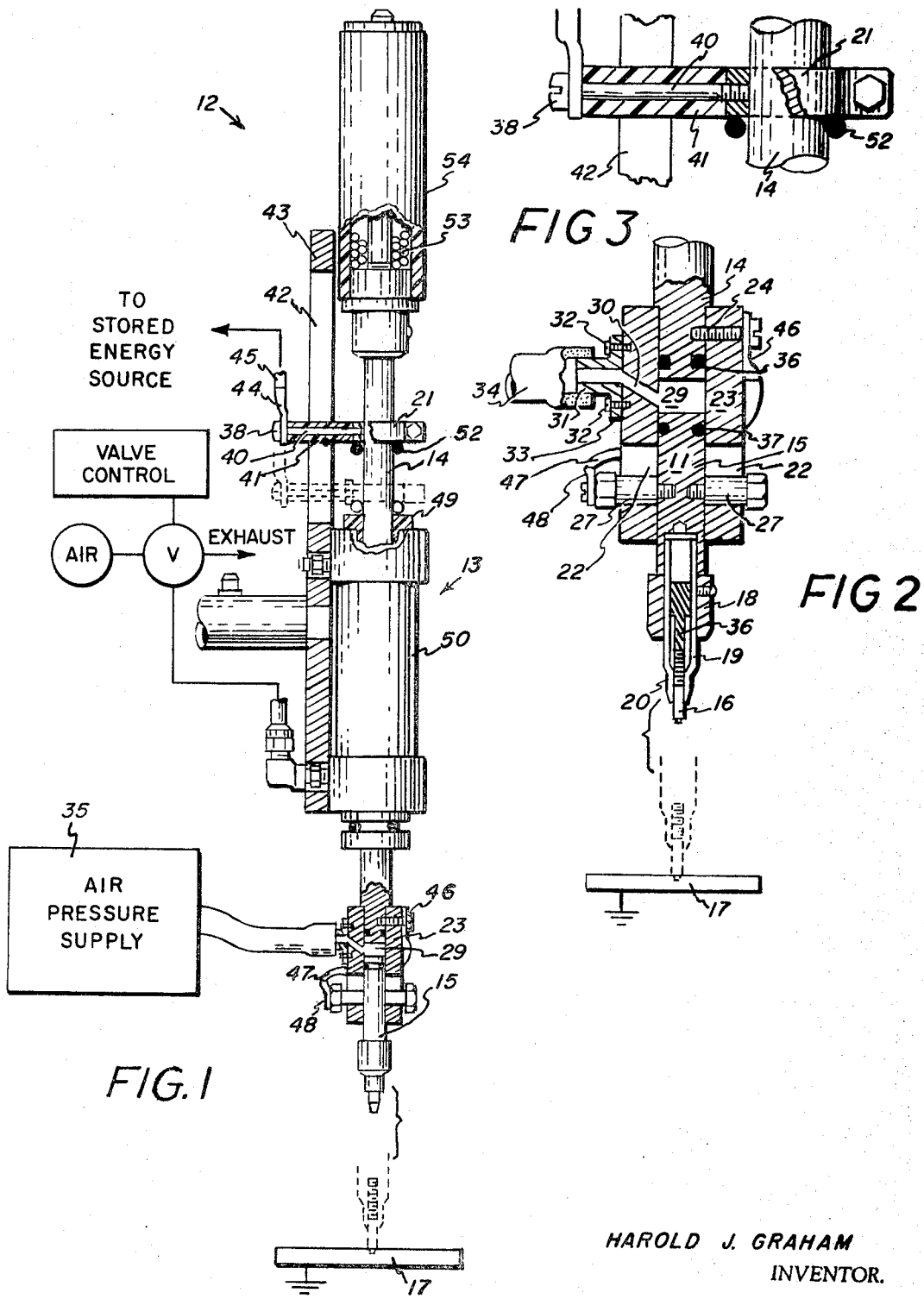

STUD WELDING APPARATUS

DISCLOSURE

This invention relates generally to welding apparatus and more particularly to improvements in stud welding apparatus of the percussion type in which an appropriately held stud is dropped under the force of gravity to cause the stud to strike a workpiece with a predetermined force.

Such a stud welding apparatus is described in my copending U.S. Pat. application, Ser. No. 391,157, filed Aug. 21, 1964, now U.S. Pat. No. 3,415,974. As described in that application, the apparatus is especially useful for welding studs to the surfaces of larger workpieces. As the supporting means and the stud holder supported thereby are caused to move from an upper position over the workpiece downwardly to a lower position where the end of the stud strikes a portion of the surface of the workpiece, an electrical arc is produced between the tip portion of the stud and the workpiece so that the pieces are welded together as the stud strikes with a percussive force. In striking the surface, the stud tends to rebound away from the workpiece, a condition which tends to produce ineffective welds. In order to adjust the weight of the support member and, hence, the force with which the stud strikes the workpiece, means are provided in the form of loose shot supported within a cavity at the upper end of the stud holder shaft. Such loose shot also tends to absorb the shock of the impact when the stud strikes the workpiece and thereby to prevent such rebounding action.

It has been found, however, that such apparatus as described in my previous application is not always entirely satisfactory, particularly when the stud itself if relatively small and the materials used for the stud or the workpiece are relatively light in weight. In such situations when the full weight of the supporting shaft carrying the stud is applied to the stud end as it strikes the workpiece, the force of the impact may be sufficient to damage the stud or the workpiece, or both, and may result in a defective weld. This invention overcomes these defects and provides improved operation of the welding apparatus of my previously filed application, particularly when such apparatus is utilized for relatively small and light weight elements.

In my present invention, the stud supporting means comprises two principal sections, a first upper section, which in a preferred embodiment includes a stud support shaft which makes up the major portion of the overall mass of the stud supporting means and is adapted to move under gravity from an upper to a lower position, and a second lower section flexibly attached, or coupled, to the lower end of said first section so that not solid or rigid contact exists between the two sections. The lower section is, thus, adapted to be carried along and moved under gravity together with the upper section as the latter moves from its upper position toward the lower position. By using such a flexible coupling arrangement, however, the lower section is arranged to be independently moveable relative to the upper section and is separate and appropriately spaced therefrom. The lower section is further appropriately arranged to hold the stud, which is to be welded to the workpiece, and in a preferred embodiment may utilize a suitably fingered chuck, or collet, which retains the stud so that one end of it projects outwardly therefrom toward the workpiece.

In the operation of the improved apparatus of my invention, the upper section of the overall stud supporting means and the lower independently moveable stud holder section thereof are both simultaneously retained in the upper position over the workpiece until the actual weld is to be made. During the welding process, the stud supporting means is released and both sections move downward under gravity from such upper position toward the workpiece at a known speed.

When the tip end of the stud has moved to a position where it is immediately adjacent or is in actual contact with the workpiece surface, an electric arc is produced to vaporize the tip and heat the appropriate areas of the stud and workpiece to form the weld as described in my previously filed application. Since the stud is held in the vertically moveable lower section of the supporting means, and such lower section is not rigidly connected to the upper section, the mass of the upper section does not contribute to the force of impact of the stud on the workpiece surface and the impact force is essentially due to the mass of the lower section only. In such a manner the percussive impact force is sufficient to produce a good weld but is not sufficient to damage the elements which are being welded.

When the stud strikes the workpiece, it and the lower section holding it both tend to move away from the workpiece after impact in a rebounding action. Means are, therefore, also provided for maintaining the stud in substantial contact with the workpiece surface once such contact has been made so that the tendency of the lower section to move away from the workpiece surface in a rebounding action is prevented. While the lower section is, thus, held to maintain contact between the stud and workpiece, the upper section continues to move in a downward direction and tends to close the spacing between it and the lower section. In order to prevent the upper section from moving downward to a position where it closes such spacing entirely and directly contacts the lower section with the full impact of its mass, its motion is appropriately arrested by a suitable stop means provided for that purpose. The location of said stop means is adjustable and can be arranged to prevent the upper section from ever reaching a position where it makes a rigid contact with the lower section and, thus, the effect of the motion of the relatively large mass of the upper section is essentially never felt at the point of impact of the stud end upon the workpiece surface.

In a particular preferred embodiment of the invention the upper section and the independently moveable lower section of the stud supporting means may be arranged with an appropriate volumetric air space therebetween. Air, or other suitable gas, is supplied under pressure to such space to produce a suitable cushion of pressure against the lower section which air cushion tends to maintain contact between the stud and the workpiece during the weld and thereby prevent the undesired rebounding action. The adjustable stop member thereupon stops the downward motion of the upper section before latter either comes into direct contact with the lower section or before the volume of such space is reduced sufficiently to cause the mass of the upper section to produce any appreciable impact effect between the stud and workpiece.

The structure and operation of the invention can be understood more clearly with the help of the enclosed drawing wherein:

FIG. 1 shows an elevational view partially in cross section of an overall stud welding apparatus which utilizes my invention;

FIG. 2 shows an enlarged cross-sectional view of a portion of the apparatus of FIG. 1; and FIG. 3 shows an enlarged cross-sectional view of another portion of the apparatus of FIG. 1.

A complete stud welding apparatus of the same general type shown in FIG. 1, but not utilizing the inventive features which are discussed in more detail herein, as shown in the single FIG. contained in my previously filed above-referenced application. For that reason many elements of the structure thereof, which do not specifically concern my inventive improvement and which are adequately shown and discussed in my previous application, are not reproduced in detail here.

With reference to the FIGS. of the accompanying drawing, a stud welding apparatus 12 includes a stud supporting means 13, generally in the form of a shaft which is adapted for movement between an upper position, as shown by the solid lines of the FIGS., to a lower position, shown with reference to certain portions of the apparatus by the phantom lines in the drawing. Stud supporting means 13 includes a first upper section 14 and a second lower section 15, the latter, as shown more clearly in FIG. 2, being arranged to hold, or retain, a stud 16 which is to be welded to the surface of a workpiece 17 mounted on an appropriate work table, not shown in detail. Lower section 15 comprises a cylindrical member 11 having an enlarged end portion 18 and an opening at the lower end thereof into which is inserted a collet 19 having a plurality of flexible fingers 20 which frictionally engage the shank of stud 16, the tip end of which, in the particular embodiment shown, has a smaller cross-sectional area than said shank portion.

Lower section 15 is flexibly attached to the lower end of upper section 14 via an appropriate cylindrical sleeve 23 fastened at one end to upper section 14 by a suitable set screw 24 inserted in appropriately alined threaded openings in sleeve 23 and in upper shaft section 14, respectively. Lower section 15 is thereupon held within a pair of slots 22 in sleeve 23 by a pair of bolts 27 so that lower section 15 is vertically moveable within said sleeve independently of the motion of upper shaft section 14. Lower section 15 is suitably spaced from any direct contact with upper section 14 by means of an air gap, or air space, 29 provided therebetween within sleeve 23. Sleeve 23 is provided with a passageway 30 leading from air space 29 to a tubular support 31 which is attached to sleeve 23 by means of bolts 32 extending through a flange portion 33 thereof. Alternatively, tubular support 31 may be formed integrally with the body of sleeve 23. A flexible hose 34 encloses the end of tubular support 31 and leads to an appropriate air pressure supply 35 which supplies air under pressure to fill space 29 between upper and lower sections 14 and 15, respectively. A pair of O-rings 36 and 37 are located in appropriate annular notches in upper section 14 and lower section 15, respectively, to prevent the leakage of air from air space 29.

Stud 16 is inserted into collet 19 until it reaches a member 36 which engages the rear end of the welding stud for properly positioning such stud within the stud holder so that its tip end extends a predetermined distance outwardly therefrom.

With reference to the view shown in FIG. 1 and FIG. 3, a stop member 21 is attached to an exposed shaft portion of upper section 14, the vertical position of such stop member on the shaft body being capable of adjustment by the welding apparatus operator. Stop member 21 is in the form of a collar enclosing the shaft of upper section 14 and is held tightly on such shaft by a suitable bolt and nut arrangement as shown. The threaded end of another bolt 38 is inserted in an appropriately threaded opening in the wall of stop member 21. The unthreaded shaft extension 40 of bolt 38 is enclosed by a non-conductive sleeve, or covering, 41 made of Teflon or other suitable low friction material, so that a portion of shaft extension 40 of bolt 38 rides vertically within a slot 42 of a guide element, or plate, 43 in order to prevent rotation of the shaft supporting means 13 during its downward movement. Such guide element is similar to that shown in my previously filed application.

Bolt 38 has a terminal lug 44 attached thereto, which terminal lug is fastened to a welding lead 45 which is connected to the ungrounded high side of a source (not shown) of stored electrical energy of the type shown in my previously filed application, the grounded low side of such source being connected to the workpiece as shown schematically by wire lead 51. During the welding operation a current path is thereby provided from welding lead 45 to stud 16 via bolt 38, upper shaft section 14, a terminal lug 46 attached to set screw 24 at sleeve 23, a lead 47 from terminal lug 46 to another terminal lug 48 attached to one of the pair of bolts 27, lower section 15 and collet 19 to stud 16.

An O-ring 52 is placed in abutting relationship to the lower surface of stop member 21 and, as described in more detail later, provides an appropriate cushion during the contact of stop member 21 with the upper surface of a Teflon bushing 49 inserted at the top of cylinder 50 during the welding operation.

As discussed in my above-referred to, previously filed application, preparatory to making the weld, the overall stud supporting means 13 is raised to its upper position, as shown in the drawing, by appropriate pneumatic or hydraulic means which in one particular embodiment supplies air under pressure via a suitably controlled two position valve to a chamber within the cylinder 50 in which a portion of upper section 14 is located, as shown in the FIG. The details of such operation are similar to those already adequately described in my previously filed application cited above and are not further discussed here.

During the welding operation the stud supporting means is retained is such upper position until the weld is to be made. When the operator desires to make the weld, stud supporting by suitable operation of the controlled valve, described in detail in my previously cited application, stud supporting means 13 is appropriately released from its upper position by suitable operation of the controlled valve, described in detail in my previously cited application, and, with air pressure appropriately being supplied to air space 29 from air pressure supply 35, both its upper section 14 and its lower section 15 thereby move together downwardly under gravity toward workpiece 17. The speed of such downward motion is determined by the overall mass of supporting means 13 together with the mass of the loose shot 53 located within a cavity 54 attached to an carried downwardly with the upper portion of stud supporting means 13 as shown. Stud supporting means 13 ultimately reaches a position where the tip end of stud 16 comes into contact with or is closely adjacent the surface of workpiece 17. As described in my previously filed application, current flows between the stud and the workpiece, since they are maintained at different voltage potentials, and such current quickly heats and vaporizes the tip end 21 of stud 16 to produce an electric arc between the stud and the workpiece. The arc melts opposing portions of the shank end of the stud and of the surface of the workpiece so that when the stud and workpiece are driven together by the force of impact of lower section 15 on the workpiece, such melted portions contact each other and fuse together to form the weld.

When the weld is actually being formed the required percussive action occurs substantially solely because of the movement of the mass of lower section 15 which produces the required impact of the stud against workpiece 17 independently of the movement of the mass of upper section 14 and the loose shot attached thereto. Thus, unlike the percussive action in my previously filed application, the major portion of the mass of the stud supporting means 13, which major portion is made up of the larger mass of the upper section 14 together with the mass of the loose shot and cavity structure carried therewith, does not contribute to the force of impact of the stud on the workpiece since it is not rigidly connected to lower end section 15 and has not suitable rigid mechanical path through which such force therefrom can be imparted.

After the percussive impact of stud 16 upon workpiece 17, due to the force imparted thereto by lower section 15, occurs, the stud (and lower section 15) tends to move upwardly away from the surface of the workpiece in a rebounding action. However, the air under pressure which fills air space 29 between lower section 15 and upper section 14 produces a sufficient downward force against lower section 15 to prevent the stud from so rebounding and essentially maintains the stud in contact with the workpiece surface at all times during the weld. Since, at the time stud 16 contacts workpiece 17, upper section 14 has not yet reached a position where stop member 21 is in contact with bushing 49, upper section 14 continues its downward movement and tends, thereby, to reduce the volume of air space 29. Such action further compresses the air within such air space volume and tends to increase the effectiveness of the force of such air pressure in preventing the rebounding action.

Before upper section 14 can move further downward to a position where it would actually come into contact with lower section 15, however, stop member 21 comes into contact with bushing 46 via O-ring 52 and prevents further downward movement of upper section 14. The position at which such downward motion is stopped is adjustably determined by the location of stop member 21 on the upper shaft body.

Thus, the full impact of force due to the overall mass of stud supporting means 13 and the loose shot structure is not imparted to the stud and workpiece during the welding operation and the chance of damaging such elements or of making defective welds is considerably reduced even when either or both such elements are relatively small or light in weight. Moreover, because of the presence of air under pressure within the air space between the two sections of the stud supporting means, a sufficient downward force is maintained on the independently moveable lower section 15 to prevent the stud from rebounding away from the workpiece during the welding operation.

During the welding operation, the presence of lead shot in the chamber above upper shaft section 14 has essentially no effect on the rebounding action as it would have when a completely rigid shaft supporting means, as shown in my previously filed application, is used to carry the stud. However, because the overall mass of stud supporting means 13 together with the mass of the lead shot is utilized during the travel of such means from its upper position toward the lower position, the speed of travel at impact is still maintained at a known value, which is constant from weld to weld, as in my above-referred to previously filed application, and can be controlled by adjusting the weight of the lead shot as previously explained therein.

Although the particular embodiment shown in the FIG. and described above represents one preferred embodiment of my invention, it is clear that variations thereof may occur to those skilled in the art without departing from the spirit and scope of the invention. For example, the pressure of the air supplied to air space 29 between the upper and lower sections may be varied and appropriately adjusted for operation with different sizes and weights of stud and workpiece elements. Alternatively, the desired effect thereof may be obtained from other suitable compressible means, such as a spring or a cushion of appropriately resilient material located in the gap between the upper and lower sections. The characteristics of such compressible means may be selected to provide a similar action in preventing the overall mass of the upper section from being rigidly connected to the lower section while at the same time producing a force sufficient to prevent a rebounding action. Further, other suitable flexible coupling arrangements may occur to those in the art for permitting movement of the lower section independently of the upper section so that the mass of the upper section does not contribute to the force of impact of the stud upon the workpiece. Hence, the invention is not be construed as limited to the specific embodiments discussed and shown herein except as defined by the appended claims.

I claim:

1. A stud welding apparatus comprising:
   means for supporting a stud which is to be welded to a workpiece, said stud supporting means including:
      an upper section adapted to move between an upper position and a lower position;
      a lower section for holding said stud;
      means for coupling said lower section to said upper section, said coupling means including means for providing free vertical movement of said lower section relative to said upper section over a prescribed distance independently of the vertical movement of said upper section whereby said lower section is adapted for movement with said upper section and is further adapted for said free vertical movement;
   means for retaining said stud supporting means in said upper position over a workpiece;
   means for moving said stud supporting means from said upper position toward said lower position whereby one end of said stud is caused to strike the surface of said workpiece and said free vertical movement of said lower section relative to said upper section prevents the mass of said upper section from contributing to the force of impact of said stud on said workpiece when said stud contacts said workpiece;
   compressible means located between said upper and lower sections for absorbing the force of impact on said workpiece to prevent the rebound of said stud from said workpiece surface;
   means for arresting the downward movement of said upper section at a preselected position as to prevent the mass of said upper section from contacting said lower section; and
   means for supplying a welding current through said stud and said workpiece to effect a weld.

2. A stud welding apparatus in accordance with claim 1, wherein said moving means comprises means for causing said stud supporting means to fall by gravity.

3. A stud welding apparatus in accordance with claim 2, wherein said compressible means includes:
   an air space located between said upper and lower sections; and
   means for supplying air under pressure to said air space.

4. A stud welding apparatus in accordance with claim 3, wherein said movement arresting means comprises:
   a stop member adjustably attached to a shaft portion of said upper section and adapted to contact a fixed surface of said apparatus during the downward movement of said upper section whereby said downward movement of said upper section is arrested at said preselected position.

5. A stud welding apparatus in accordance with claim 4 and further including:
   a guide element having a slot therein;
   means attached to said stop member and retained with said slot for preventing the rotation of said stud supporting means during its movement from said upper position toward said lower position.

6. A stud welding apparatus in accordance with claim 1, wherein said coupling means comprises:
   a sleeve member being attached to said upper section and having a pair of slots therein;
   means attached to said lower section and inserted in said slots for providing said free vertical movement of said lower section independent of the movement of said upper section.

7. A method for welding a stud to a workpiece comprising the steps of:
   retaining said stud within a stud supporting means in an upper position above said workpiece;
   moving said stud from said upper position downwardly toward a lower position at a known speed to cause said stud to strike said workpiece with an impact force due substantially to the mass of only a lower section of said stud supporting means;
   generating an electrical arc between said stud and said workpiece when said stud is at or adjacent said workpiece;
   providing a force to maintain said stud substantially in contact with said workpiece following its impact thereon; and
   arresting the downward movement of the mass of the upper section of said stud supporting means at a preselected position to prevent it from contributing to the force of impact of said stud on said workpiece during said welding operation.